(12) United States Patent
Burns, Jr.

(10) Patent No.: US 8,526,583 B2
(45) Date of Patent: Sep. 3, 2013

(54) MEDIA TERMINAL ADAPTER (MTA) LOCAL RINGBACK OPTION

(76) Inventor: James M. Burns, Jr., Dacula, GA (US)

( * ) Notice: Subject to any disclaimer, the term of this patent is extended or adjusted under 35 U.S.C. 154(b) by 1490 days.

(21) Appl. No.: 11/536,727

(22) Filed: Sep. 29, 2006

(65) Prior Publication Data

US 2008/0080680 A1 Apr. 3, 2008

(51) Int. Cl.
*H04M 1/64* (2006.01)

(52) U.S. Cl.
USPC .............. 379/88.21; 370/395.54; 379/21; 379/29.06; 379/88.23; 379/142.01; 379/167.13; 709/217

(58) Field of Classification Search
USPC .. 379/88.2, 88.21, 29.01, 21, 142.05–142.06, 379/142.14–142.18, 29.06, 88.23, 167.13; 370/395.54; 709/217
See application file for complete search history.

(56) References Cited

U.S. PATENT DOCUMENTS

| | | | |
|---|---|---|---|
| 4,689,801 A | | 8/1987 | Nurczyk et al. |
| 5,544,235 A | | 8/1996 | Ardon |
| 5,546,447 A | * | 8/1996 | Skarbo et al. ............ 379/142.05 |
| 5,684,988 A | | 11/1997 | Pitchaikani et al. |
| 5,699,419 A | | 12/1997 | Ardon |
| 5,799,060 A | * | 8/1998 | Kennedy et al. ............ 379/29.05 |
| 5,937,034 A | * | 8/1999 | Kennedy et al. ............ 379/29.06 |
| 6,005,921 A | * | 12/1999 | Keefe et al. ................ 379/29.06 |
| 6,122,348 A | * | 9/2000 | French-St. George et al. ........................ 379/88.23 |
| 6,324,263 B1 | | 11/2001 | Sherwood et al. |
| 6,898,274 B1 | | 5/2005 | Galt et al. |
| 6,937,713 B1 | | 8/2005 | Kung et al. |
| 6,940,866 B1 | | 9/2005 | Miller et al. |
| 6,985,492 B1 | * | 1/2006 | Thi et al. ........................ 370/429 |
| 7,002,995 B2 | | 2/2006 | Chow et al. |
| 7,006,479 B1 | | 2/2006 | Joo et al. |
| 7,010,002 B2 | | 3/2006 | Chow et al. |
| 7,068,757 B1 | | 6/2006 | Burnett |
| 7,103,067 B1 | | 9/2006 | Singh et al. |
| 7,116,771 B2 | * | 10/2006 | Charania et al. ......... 379/201.12 |
| 7,123,692 B2 | * | 10/2006 | Atkinson et al. ................ 379/21 |

(Continued)

FOREIGN PATENT DOCUMENTS

| | | |
|---|---|---|
| CA | 2310982 A1 | 12/2000 |
| CN | 1108449 A | 5/2003 |

(Continued)

OTHER PUBLICATIONS

"Access and Terminals (AT); IPCablecom Access Network; End to End Provisioning for the IPAT Architecture (Between the eMTA to the V5.2 Interface); ETSI TR 102 305," ETSI Standards, European Telecommunications Standards Institute, Sophia-Antipo, FR, vol. AT-Digital, No. V111, Mar. 2004, XPO14015619 ISSN: 0000-0001; p. 15-17, line 18, p. 31.

(Continued)

*Primary Examiner* — Gerald Gauthier
(74) *Attorney, Agent, or Firm* — Merchant & Gould

(57) ABSTRACT

Systems and methods are disclosed for enabling a media terminal adapter (MTA) for locally ringing back coupled telephones having a caller identification display. Management information base (MIB) objects are defined to enable a caller identification information function along with caller identification name and number in order to verify the caller identification information is working properly. A technician or user dials a predetermined digit string from a coupled telephone, and the MTA responds with the defined caller identification information.

17 Claims, 4 Drawing Sheets

(56) References Cited

U.S. PATENT DOCUMENTS

| | | | |
|---|---|---|---|
| 7,145,887 | B1 | 12/2006 | Akgun et al. |
| 7,263,111 | B1 | 8/2007 | Davis et al. |
| 7,280,532 | B2 | 10/2007 | Um |
| 7,295,566 | B1 | 11/2007 | Chiu et al. |
| 7,333,492 | B2* | 2/2008 | Wu et al. .................. 370/392 |
| 7,447,780 | B2* | 11/2008 | McMahon et al. ............ 709/227 |
| 7,502,457 | B2 | 3/2009 | McBlain et al. |
| 7,505,759 | B1 | 3/2009 | Rahman |
| 7,701,954 | B2* | 4/2010 | Rabenko et al. ............. 370/401 |
| 7,860,230 | B2 | 12/2010 | Martin |
| 8,233,491 | B2* | 7/2012 | Burns, Jr. ................ 370/395.54 |
| 8,363,805 | B2* | 1/2013 | Burns et al. ............. 379/167.13 |
| 2001/0055376 | A1 | 12/2001 | Karas |
| 2002/0064259 | A1 | 5/2002 | Tsai |
| 2002/0106017 | A1 | 8/2002 | Dombkowski et al. |
| 2002/0114431 | A1* | 8/2002 | McBride et al. ............ 379/88.21 |
| 2002/0150081 | A1 | 10/2002 | Fang |
| 2003/0007617 | A1 | 1/2003 | McAlinden |
| 2003/0108176 | A1 | 6/2003 | Kung et al. |
| 2004/0008724 | A1 | 1/2004 | Devine et al. |
| 2004/0028208 | A1 | 2/2004 | Carnazza et al. |
| 2004/0066913 | A1* | 4/2004 | Kennedy et al. ................. 379/22 |
| 2004/0090968 | A1 | 5/2004 | Kimber et al. |
| 2004/0114747 | A1 | 6/2004 | Trandal et al. |
| 2004/0170268 | A1 | 9/2004 | Hakusui |
| 2004/0208177 | A1 | 10/2004 | Ogawa |
| 2004/0249927 | A1 | 12/2004 | Pezutti |
| 2005/0018651 | A1 | 1/2005 | Yan et al. |
| 2005/0047423 | A1 | 3/2005 | Kaul et al. |
| 2005/0078689 | A1 | 4/2005 | Sharma et al. |
| 2005/0114518 | A1 | 5/2005 | McMahon et al. |
| 2005/0180393 | A1 | 8/2005 | Skubisz |
| 2005/0190891 | A1 | 9/2005 | Shah et al. |
| 2005/0198391 | A1 | 9/2005 | Coldren |
| 2005/0216949 | A1 | 9/2005 | Candelora et al. |
| 2006/0285487 | A1 | 12/2006 | Yasuie et al. |
| 2006/0291643 | A1 | 12/2006 | Pfaff et al. |
| 2007/0133516 | A1 | 6/2007 | Stein |
| 2007/0133776 | A1 | 6/2007 | Jain et al. |
| 2007/0140445 | A1* | 6/2007 | Ito ............................. 379/88.21 |
| 2007/0168462 | A1* | 7/2007 | Grossberg et al. ............ 709/217 |
| 2007/0198681 | A1 | 8/2007 | Bakke et al. |
| 2007/0201473 | A1 | 8/2007 | Bhatia et al. |
| 2007/0201481 | A1 | 8/2007 | Bhatia et al. |
| 2007/0218866 | A1 | 9/2007 | MacIver et al. |
| 2007/0274213 | A1 | 11/2007 | Stephan et al. |
| 2007/0297384 | A1* | 12/2007 | Burns et al. .................... 370/342 |
| 2008/0043927 | A1 | 2/2008 | Lysaght et al. |
| 2008/0043970 | A1* | 2/2008 | Scholes et al. ............. 379/212.01 |
| 2008/0080680 | A1* | 4/2008 | Burns ........................ 379/88.21 |
| 2008/0080690 | A1* | 4/2008 | Burns ....................... 379/201.01 |
| 2008/0123627 | A1 | 5/2008 | Moreman et al. |
| 2008/0168517 | A1* | 7/2008 | Allen ........................... 725/121 |
| 2009/0143013 | A1 | 6/2009 | Hatano et al. |
| 2009/0185665 | A1* | 7/2009 | Chen ......................... 379/29.01 |

FOREIGN PATENT DOCUMENTS

| | | |
|---|---|---|
| CN | 1711744 A | 12/2005 |
| WO | WO 03028355 | 4/2003 |
| WO | WO 03/077509 | 9/2003 |
| WO | WO2004/045130 | 5/2004 |
| WO | WO2004045130 A2 * | 5/2004 |
| WO | WO 2006/015013 A2 | 2/2006 |
| WO | WO 2007/149708 A2 | 12/2007 |
| WO | WO 2008/016864 A1 | 2/2008 |
| WO | WO 2008/039719 A2 | 4/2008 |
| WO | WO 2008/039721 A2 | 4/2008 |
| WO | WO 2008/042636 A2 | 4/2008 |

OTHER PUBLICATIONS

Gordon Beacham Motorola et al., "Network Control Signaling (NCS) Signaling MIB for PacketCable and IPCablecom Multimedia Terminal Adapters (MTAs); draft-ietf-ipcdn-pktc-signaling-02.txt;" IETF Standard-Working-Draft; Internet Engineering Task Force, IETF, CH, vol. ipcdn, No. 2, Oct. 2003, XP015019953 ISSN: 0000-0004; p. 3, p. 27.

Eugene Nechamkin Broadcom Corp, Jean-Francois Mule Cablelabs: "Multimedia Terminal Adapter (MTA) Management Information Base for PacketCable and IPCablecom compliant devices; draft-ietf-ipcdn-pktc-mtamib-06.txt;" IETF Standard-Working-Draft, Internet Engineering Task Force, IETF, CH, vol. ipcdn, No. 6, Jan. 21, 2005, XP015019952, ISSN: 0000-0004, pp. 5-7, p. 28, line 29.

U.S. Appl. No. 11/461,487, filed Aug. 1, 2006, Entitled "Media Terminal Adapter Routing of Telephone Calls Based on Caller Identification Information," Inventors: Scholes et al.

U.S. Appl. No. 11/425,862, filed Jun. 22, 2006, Entitled "Media Terminal Adapter Initialization Process Display by Use of an Embedded Caller Name and Caller Identification," Inventors: Burns et al.

U.S. Appl. No. 11/536,024, filed Sep. 28, 2006, Entitled "Embedded Media Terminal Adapter Endpoint Redirect Mode," Inventor: Burns, James M.

U.S. Appl. No. 11/535,201, filed Sep. 26, 2006, Entitled "Media Terminal Adapter with Session Initiation Protocol (SIP) Proxy," Inventors: Moreman, et al.

International Search Report of PCT/US2007/079309 mailed Mar. 18, 2008.

European patent application No. 07853604.2 EPO communication dated Sep. 30, 2009.

U.S. Office Action dated Jan. 13, 2011 cited in U.S. Appl. No. 11/536,024.

U.S. Final Office Action dated Jun. 22, 2011 cited in U.S. Appl. No. 11/536,024.

Canadian Office Action dated Mar. 25, 2011 cited in Application No. 2,659,639.

Canadian Office Action dated Jan. 27, 2011 cited in Application No. 2,655,422.

Chinese First Office Action dated Mar. 16, 2011 cited in Application No. 200780023103.8.

U.S. Office Action dated Apr. 28, 2011 cited in U.S. Appl. No. 11/461,487.

Canadian Office Action dated May 4, 2012 cited in Application No. 2,664,578, 5 pgs.

Canadian Office Action dated May 22, 2012 cited in Application No. 2,664,793, 2 pgs.

Canadian Office Action dated Jun. 21, 2012 cited in Application No. 2,655,422, 2 pgs.

U.S. Final Office Action dated Sep. 2, 2011 cited in U.S. Appl. No. 11/461,487.

Canadian Office Action dated Aug. 1, 2012 cited in Application No. 2,664,706, 2 pgs.

Canadian Office Action dated Sep. 8, 2011 cited in Application No. 2,655,422.

Canadian Office Action dated Jan. 31, 2012 cited in Application No. 2,655,422.

Canadian Office Action dated Jan. 21, 2013 cited in Application No. 2,655,422, 3 pgs.

Chinese Fourth Office Action dated Jan. 23, 2013 cited in Application No. 200780023103.8, 8 pgs.

Canadian Office Action dated Jan. 23, 2013 cited in Application No. 2,664,793, 2 pgs.

Canadian Office Action dated Feb. 10, 2012 cited in Application No. 2,659,639, 3 pgs.

Luan Dang, Cullen Jennings, David Kelly—Practical VoIP using Vocal, 2002.

RFC 3015.

RFC 2543.

James Dahl Cable Television Laboratories et al., "Draft New Recommendation J.ipc2arch," ITU-T Draft Study Period 2005-2008, International Telecommunication Union, Geneva, CH, vol. Study Group 9, Aug. 2005, pp. 1-38.

Fred Baker Bill Foster Chip Sharp: "Cisco Architecture for Lawful Intercept in IP Networks; draft-baker-slem-architecture-02.txt;" IETF Standard-Working-Draft, Internet Engineering Task Force, IETF, CH, No. 2, Oct. 2003, XP015010527 ISSN: 0000-0004, p. 5-p. 13.

Baker Cisco Systems F: "Cisco Lawful Intercept Control MIB draft-baker-slem-mib-00; draft-baker-slem-mib-00.txt" IETF Standard-Working-Draft, Internet Engineering Task Force, IETF, CH, Apr. 2003, XP015000178 ISSN: 0000-0004, pp. 9, 23, 33.
International Search Report and Written Opinion mailed Dec. 28, 2007 cited in Application No. PCT/US2007/070692.
International Search Report and Written Opinion mailed Dec. 28, 2007 cited in Application No. PCT/US2007/074688.
International Search Report and Written Opinion dated Mar. 10, 2008 cited in PCT/US2007/079313.
International Search Report and Written Opinion mailed Mar. 18, 2008 cited in PCT/US2007/079309.
International Search Report and Written Opinion mailed Mar. 25, 2008 cited in PCT/US2007/079307.
European Communication dated Jun. 4, 2009 cited in Application No. 07 798 275 9.
International Preliminary Report on Patentability mailed Mar. 10, 2010 cited in PCT/US2007/079313.
European Communication dated Apr. 9, 2010 cited in Application No. 07 853 608.3.
U.S. Official Action dated Dec. 20, 2007 in U.S. Appl. No. 11/535,201.
U.S. Official Action dated Jun. 13, 2008 in U.S. Appl. No. 11/535,201.
U.S. Official Action dated Oct. 16, 2008 in U.S. Appl. No. 11/535,201.
U.S. Official Action dated Mar. 5, 2009 in U.S. Appl. No. 11/535,201.
U.S. Official Action dated Sep. 4, 2009 in U.S. Appl. No. 11/535,201.
U.S. Official Action dated Sep. 30, 2009 in U.S. Appl. No. 11/425,862.
U.S. Official Action dated Dec. 10, 2009 in U.S. Appl. No. 11/461,487.
U.S. Official Action dated Mar. 17, 2010 in U.S. Appl. No. 11/425,862.
U.S. Official Action dated Mar. 29, 2010 in U.S. Appl. No. 11/536,024.
U.S. Official Action dated May 24, 2010 in U.S. Appl. No. 11/461,487.
U.S. Official Action dated Aug. 16, 2010 in U.S. Appl. No. 11/536,024.
Chinese Second Office Action dated Feb. 13, 2012 cited in Application No. 200780023103.8, 10 pgs.
Chinese Third Office Action dated Jul. 25, 2012 cited in Application No. 200780023103.8, 16 pgs.
U.S. Office Action dated Apr. 12, 2012 cited in U.S. Appl. No. 11/425,862, 16 pgs.
U.S. Office Action dated Apr. 16, 2013 cited in U.S. Appl. No. 11/461,487, 27 pgs.
Canadian Office Action dated Jun. 26, 2013 cited in Application No. 2,664,793, 2 pgs.
Canadian Office Action dated Jun. 26, 2013 cited in Application No. 2,655,422, 2 pgs.

* cited by examiner

MIB Objects Table

| MIB Objects | CID |
|---|---|
| MTA Ringback Enabled | Ringback Enabled |
| MTA Test CID Name | ABCDEFGHIJKLMNOP |
| MTA Test CID Number | 555-555-1212 |
| MTA Test CID Digit String | 999## |

FIG. 4

MEDIA TERMINAL ADAPTER (MTA) LOCAL RINGBACK OPTION

FIELD OF THE INVENTION

This invention relates in general to telephony systems over broadband, more specifically broadband over coaxial cable, and more particularly, to the field of enabling a media terminal adapter to self-generate caller identification information.

BACKGROUND OF THE INVENTION

Multiple services operators (MSOs) are now capable of providing many services in addition to broadcast audio/video signals over their existing systems. Some advanced services in a broadband communications system along provide conventional cable television signals along with other telephony services, such as high-speed data and telephone. To support these additional services, cable modems and media terminal adapters are used in the subscriber's premises and have typically been coupled with coaxial cable to a communications network. U.S. Pat. No. 6,161,011 to Loveless, the disclosure and teachings of which are incorporated herein by reference, shows an example of a hybrid fiber/coaxial (HFC) communications network that could be used to implement the present invention.

When customers switch from a traditional public switched telephone network (PSTN) to an MSO, it may take weeks to transfer updates regarding the routing information. In this manner, when a telephone having caller identification information is first installed, it is difficult to determine whether or not the caller identification function is working properly or not. Conventionally, during installation, a service technician would call a customer service representative (CSR) at the MSO from each installed telephone, and then they would manually run through a caller identification function verification. The CSR would call the installed telephone number for each caller identification telephone in order for the technician to verify that each caller identification telephone was receiving the information on the display. This process obviously takes time along with a CSR's time in order to verify the function is working properly.

Thus, there exists a need for a more efficient system and method of determining the status of the caller identification function.

BRIEF DESCRIPTION OF THE DRAWINGS

The invention can be better understood with reference to the following drawings. The components in the drawings are not necessarily drawn to scale, emphasis instead being placed upon clearly illustrating the principles of the invention. In the drawings, like reference numerals designate corresponding parts throughout the several views.

FIG. 4 illustrates a MIB objects table that includes example MIB objects and their possible display function on the caller identification device in accordance with the present invention.

DETAILED DESCRIPTION

Preferred embodiments of the invention can be understood in the context of a broadband communications system. Note, however, that the invention may be embodied in many different forms and should not be construed as limited to the embodiments set forth herein. All examples given herein, therefore, are intended to be non-limiting and are provided in order to help clarify the description of the invention.

The present invention is directed towards enabling a media terminal adapter (MTA) to generate caller identification information and provide the information to coupled customer premise equipment (CPE), e.g., a caller identification telephone, a computer softphone, or any other caller identification devices. More specifically, a technician or user would dial a specific digit string from each CPE in order to ensure that it is receiving caller identification information. Accordingly, the coupled MTA recognizes the digit string and provides generated caller identification information. In this manner, a more efficient system and method of verifying caller identification information is presented and described hereinbelow.

Figure 1:
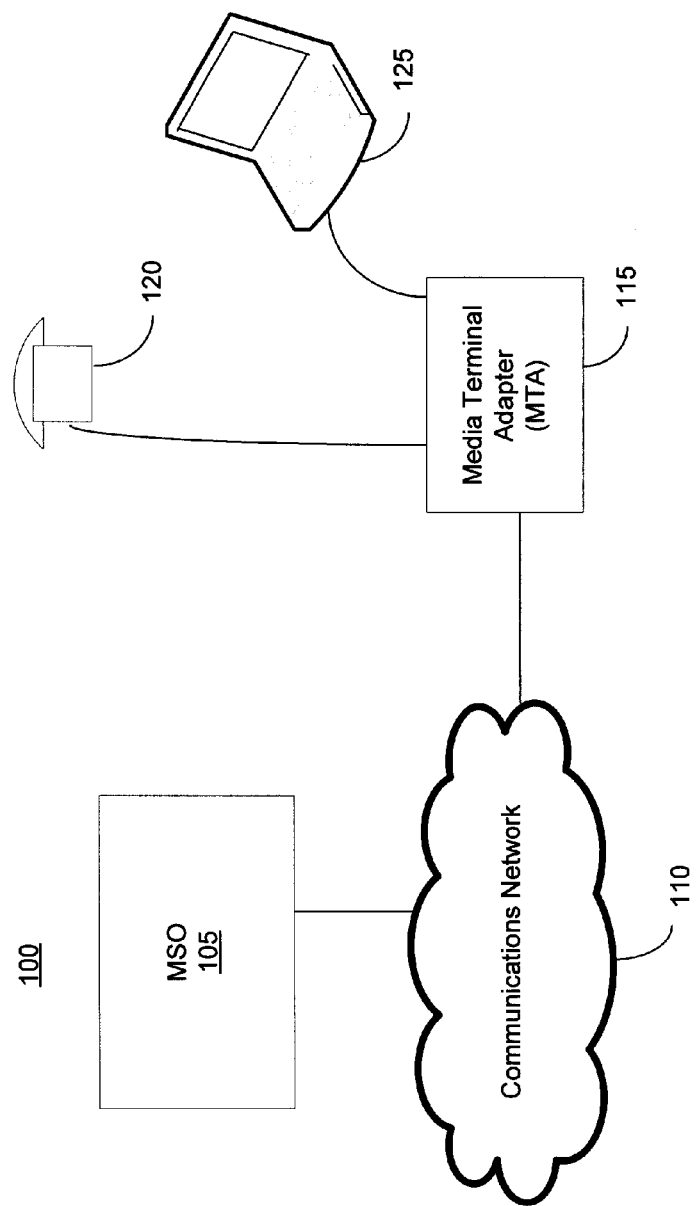
FIG. 1 is a block diagram of a communications system that is suitable for transmitting voice and data signals in a cable communications system.

FIG. 1 is a block diagram of a communications system 100 including an MSO 105 for transmitting signals, such as cable television signals, telephony signals, and other related information. A communications network 110, such as an HFC network, routes the signals to the appropriate subscriber(s). An MTA 115 receives the signals (e.g., cable, telephony, or other data signals) and forwards them to coupled CPE accordingly. In this example, telephony signals may be forwarded to a telephone 120 and a computer 125.

Figure 2:
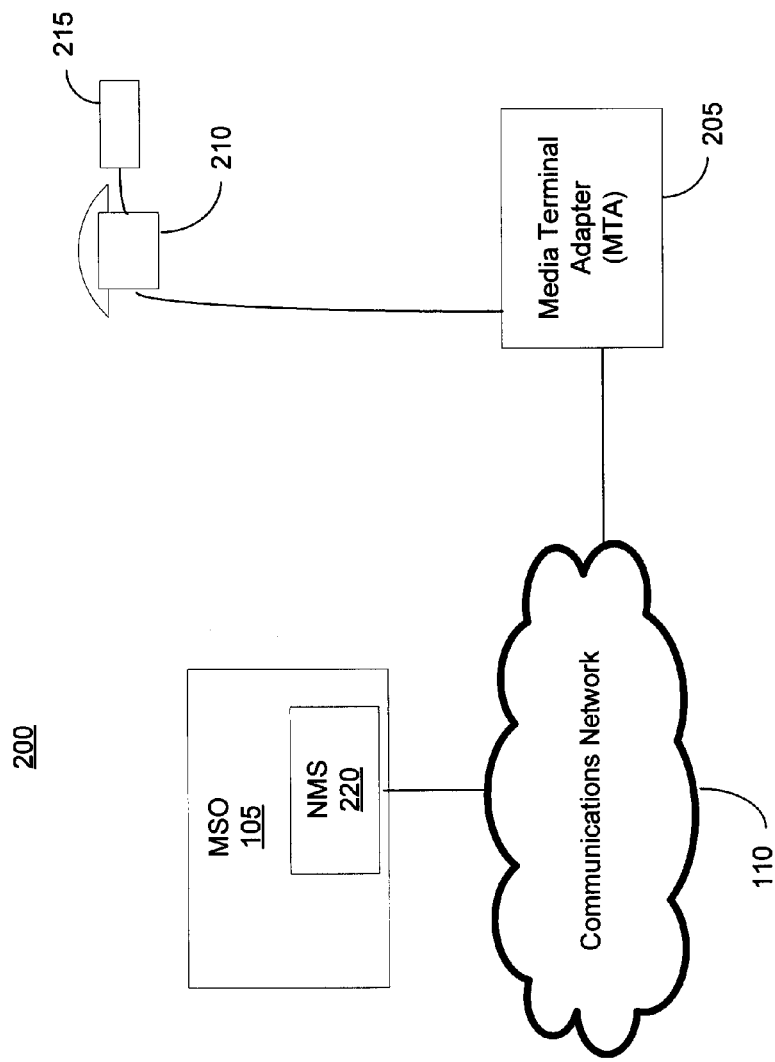
FIG. 2 is a block diagram of a communications system including an MTA coupled to CPE, e.g., a caller identification telephone or caller identification device, that is suitable for use in implementing the present invention.

FIG. 2 is a block diagram of a communications system 200 including an MTA 205 that is coupled to CPE, e.g., a caller identification telephone 210 or caller identification device 215, that is suitable for use in implementing the present invention. Received caller identification information can be displayed on a screen that is either built into the telephone 210 or a standalone device 215. In accordance with the present invention, a user dials a specific digit string on an active line from the telephone 210. The MTA 205 then receives and recognizes the digit string and, after the technician hangs up the handset, sends the appropriate network traffic indicating on-hook state, and also prepares caller identification information. In this manner, the MTA 205 then locally rings back the coupled CPE (i.e., 210) in order to ensure the caller identification device 215 is receiving caller identification information without sending any network traffic and without the technician having to contact the MSO 105.

Figure 3:
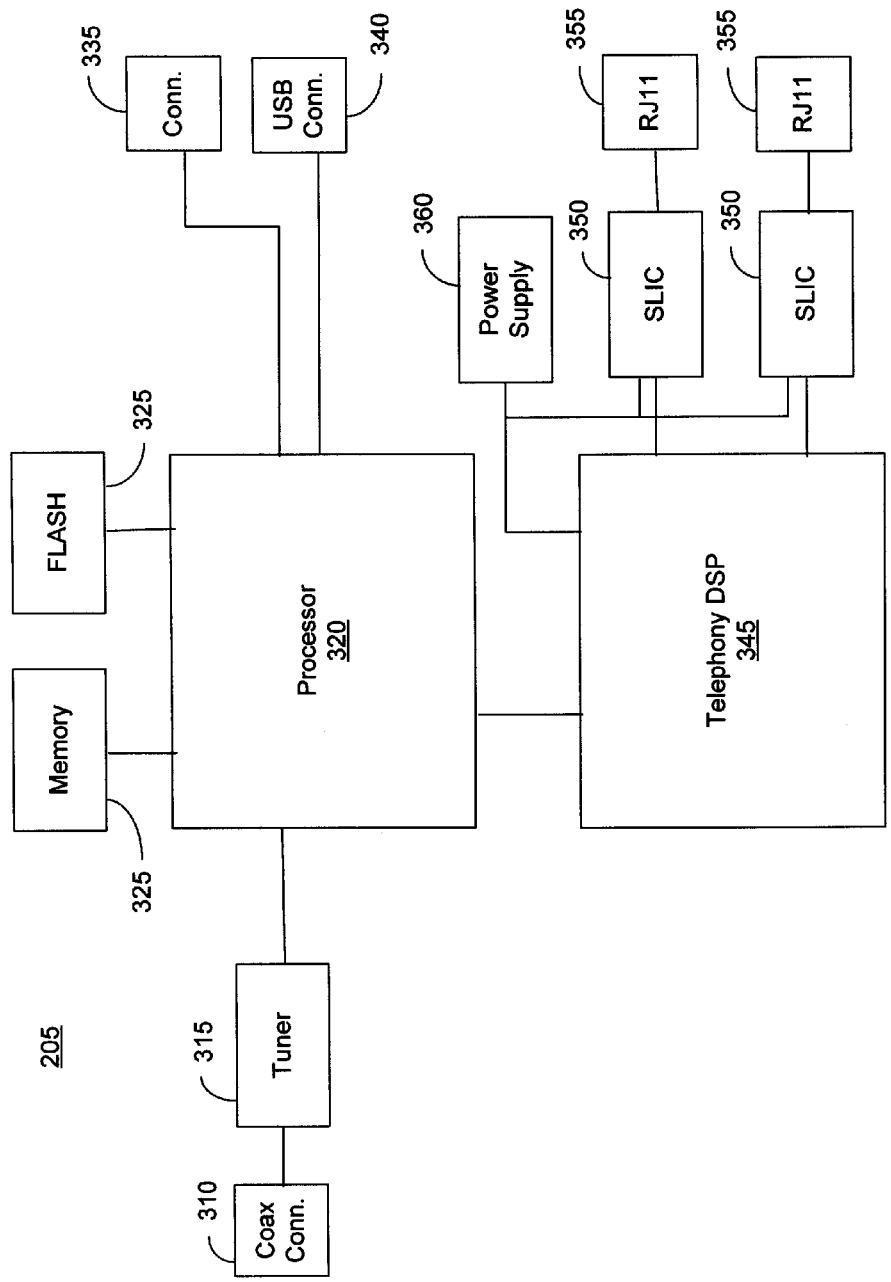
FIG. 3 is a block diagram of the MTA that is suitable for use in the system of FIG. 2.

FIG. 3 is a block diagram of the MTA 205 that is suitable for use in the system 200 of FIG. 2. A coaxial F connector 310 connects the MTA 205 to the communications network 110. A tuner 315 then receives and filters data intended for the MTA 205 and routes the data to a processor 320. If the data is intended for a coupled computer, the processor 320 routes the data to either an Ethernet connector 335 or a USB connector 340 depending upon the application. If the data is telephony data, the data is routed to a telephony digital signal processor (DSP) 345 for further processing, such as code decoding, packetization, echo cancellation, or other telephone signal processing. The telephony data is then routed to a connected telephone 210 and/or computer softphone via a subscriber line interface chip (SLIC) 350. The telephone 210 and computer are typically connected to the MTA 205 with CAT-3 or CAT-5 wiring and an RJ11 telephone jack 355. The MTA 205 also includes a power supply 360 for powering the telephony DSP 345 and the SLICs 350 as well as memory 325, such as SDRAM and Flash memory, for system storage purposes.

A network management system (NMS) 220 (FIG. 2) located at the MSO 105 communicates to the managed devices, such as the MTA 205, with management information base (MIB) objects, or information, and other commands. Therefore, included in a downloadable MTA configuration file are MIB objects that allow for configuration options of the MTA 205. In accordance with the present invention, some available MIB objects may be used in order to configure the local ringback option. The MIB objects may be communicated to the MTA 205 at the time of installation by using simple network management protocol (SNMP). After the MTA 205 is installed and on-line, the NMS 220 downloads the MTA configuration file along with the included MIB objects table. If desired, the MIB objects table could also be stored in non-volatile memory in the event that the network is down or session initial protocol (SIP) communication is used. In these cases, the MTA 205 would use the stored MIB objects table to generate default caller identification information along with its internal time to set the date and time in the caller identification message.

FIG. 4 illustrates a MIB objects table 400 that includes example MIB objects 405 and their possible display function 410 on the caller identification device in accordance with the present invention. As mentioned, the MIB object table 400 may be included in a downloadable configuration file and/or stored in the MTA 205. A first MIB object 415 may be to enable the ringback option, which is illustrated on the caller identification device 215 as 'Ringback Enabled.' A second MIB object 420 may define a caller identification (CID) name, which may be illustrated on the device 215 as the user's name or a test name shown as a series of letters. A third MIB object 425 may define a CID number, which may be illustrated on the device as the user's number or a test number. A fourth MIB object 430 defines a test CID digit string, which is shown as 999###.

Accordingly, with the systems described above, after the installation of the MTA 205, the configuration file is downloaded to the MTA along with the MIB objects table 400. With the local ringback enabled, a technician simply dials the predetermined digit string 430 from each telephone with an attached or incorporated caller identification device 215. After dialing the digit string, the technician hangs up the handset of the telephone. The MTA 205 receives the digit string and subsequently rings back the test CID name 420 and number 425. In this manner, a technician or a user is able to verify immediately if the caller identification function is working without having to manually call a CSR and/or have to wait for files to transfer from a PSTN to an MSO.

Accordingly, systems and methods have been provided that enables an MTA to locally ringback telephones in order to verify caller identification functions. It will be appreciated that further embodiments are envisioned that implement the invention, for example, using all software or adding modes for additional features and services.

What is claimed is:

1. A method for locally ringing back at least one of a telephone and a computer softphone each having a display with display information, the method comprising:
    enabling a first ringback management information base (MIB) object defining a digit string;
    enabling a second ringback MIB defining a caller identification name;
    dialing the digit string from the at least one of the one of the telephone and the computer softphone, the at least one of telephone and the computer being previously located at a customer premise;
    receiving the defined digit string at a media terminal adaptor (MTA);
    locally ringing back the at least one of the telephone and the computer softphone;
    sending the display information to the display of the at least one of the telephone and the computer without sending any network traffic and without a technician contacting a multiple services operator; and
    displaying the display information on the display of the at least one of the telephone and the computer.

2. The method of claim 1, further comprising, after dialing the defined digit string and before sending the display information to the display, hanging up one of the telephone or computer.

3. The method of claim 1, further comprising downloading the first MIB object and the second MIB object.

4. The method of claim 3, further comprising storing the downloaded first MIB object and the downloaded second MIB object in memory of the MTA.

5. The method of claim 1, wherein the display information comprises caller identification information.

6. A media terminal adaptor (MTA) for providing voice packets to at least one of a telephone or computer and information to a display connected to the at least one of a telephone or computer, the MTA comprising:
    management information base (MIB) objects comprising a first MIB object, a second MIB object, and a third MIB object, wherein the first MIB object defines a ringback enablement function, the second MIB object defines a digit string, the third MIB object defines display information, wherein MTA is configured to send the first MIB object, the second MIB object, and the third MIB object to one of a coupled telephone or computer being previously located at a customer premise, wherein when the ringback function is enabled and the MTA receives the digit string from the one of the coupled telephone or computer being previously located at the customer premise and locally rings back the at least one of the telephone or the computer, the MTA provides the display information without sending any network traffic and without a technician contacting a multiple services operator, wherein the display information is intended for display on the display of at least one of the telephone or computer.

7. The MTA of claim 6, wherein one of the coupled telephone or computer is hung up after dialing the defined digit string and before the MTA provides the defined display information.

8. The MTA of claim 6, wherein the MTA is connected to a communications network.

9. The MTA of claim 8, wherein the first MIB object, the second MIB object, and the third MIB object are downloaded to the MTA from the communications network.

10. The MTA of claim 6, wherein the first MIB object, the second MIB object, and the third MIB object are stored in memory of the MTA.

11. The MTA of claim 6, wherein the display information comprises caller identification information.

12. A communications system for transmitting and receiving video, voice, and data packets to a plurality of subscribers, the communications system comprising:
    headend equipment for transmitting packets to and locally ringing back the plurality of subscribers;
    at least one MTA located in a subscriber's premise, the at least one MTA comprising:
        management information base (MIB) objects comprising a first MIB object, a second MIB object, and a third MIB object, wherein the first MIB object defines a ringback enablement function, the second MIB object defines a digit string, and the third MIB object defines display information, wherein MTA is configured to send the first MIB object, the second MIB object, and the third MIB object to one of a coupled telephone or computer being previously located at a customer premise, wherein, when the ringback function is enabled and the MTA receives the defined digit string from the one of the coupled telephone or computer being previously located at the customer premise, the MTA provides defined display information without sending any network traffic and without a technician contacting a multiple services operator, wherein the display information is intended for display on the display of at least one of the coupled telephone or computer.

13. The communications system of claim 12, wherein one of the coupled telephone or computer is hung up after dialing the defined digit string and before the MTA provides the defined display information.

14. The communications system of claim 12, wherein the first MIB object, the second MIB object, and the third MIB object are downloaded to the at least one MTA from the headend equipment.

15. The communications system of claim 12, wherein the first MIB object, the second MIB object, and the third MIB object are stored in memory of the at least one MTA.

16. The communications system of claim 12, wherein the display information comprises caller identification information corresponding to the subscriber's premise.

17. The communications system of claim 12, wherein the display information comprises default information.

* * * * *